No. 646,956. Patented Apr. 10, 1900.
L. C. CROWELL.
ADDRESSING MACHINE.
(Application filed Dec. 1, 1897.)
(No Model.) 11 Sheets—Sheet 1.
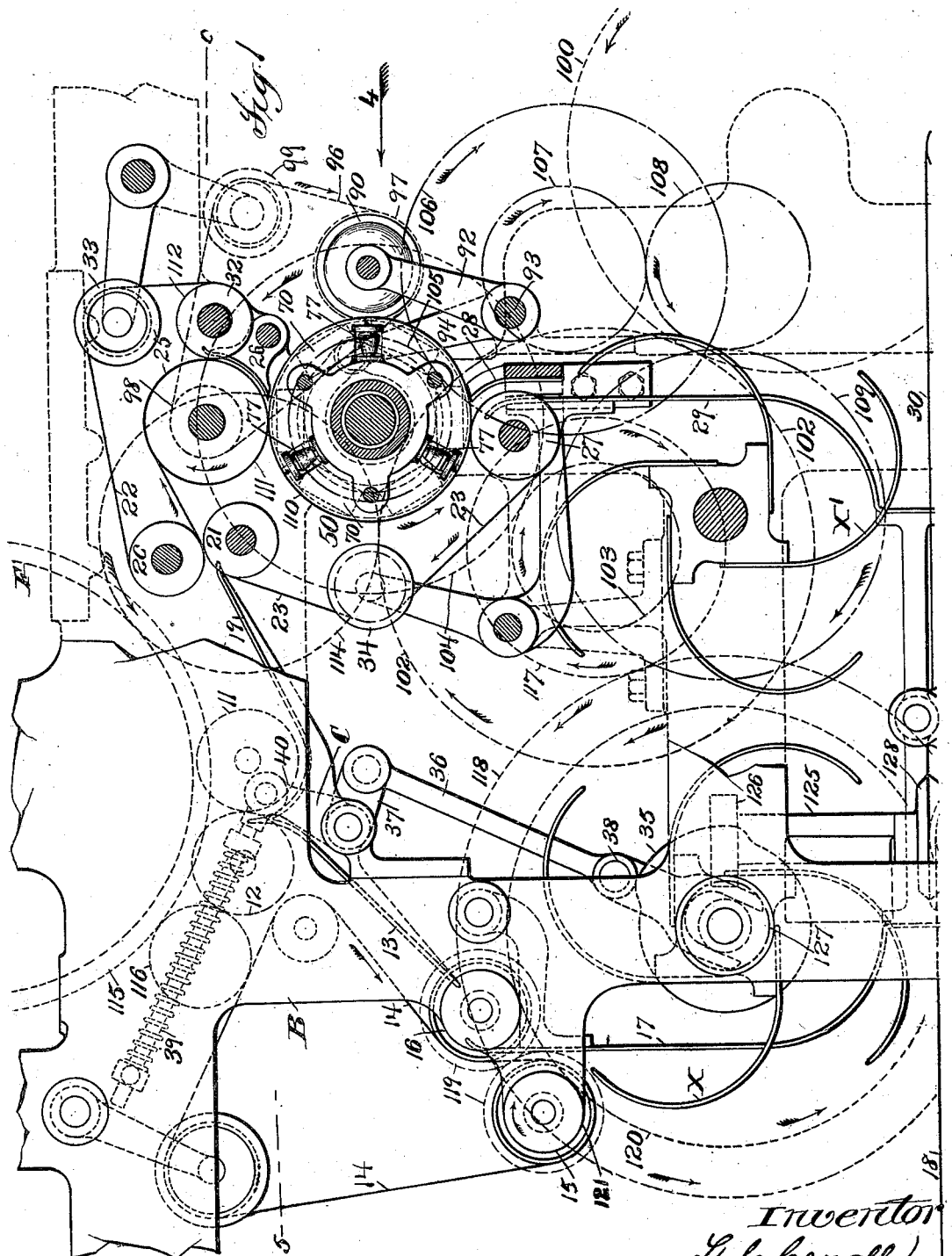

No. 646,956. Patented Apr. 10, 1900.
L. C. CROWELL.
ADDRESSING MACHINE.
(Application filed Dec. 1, 1897.)
(No Model.) 11 Sheets—Sheet 2.
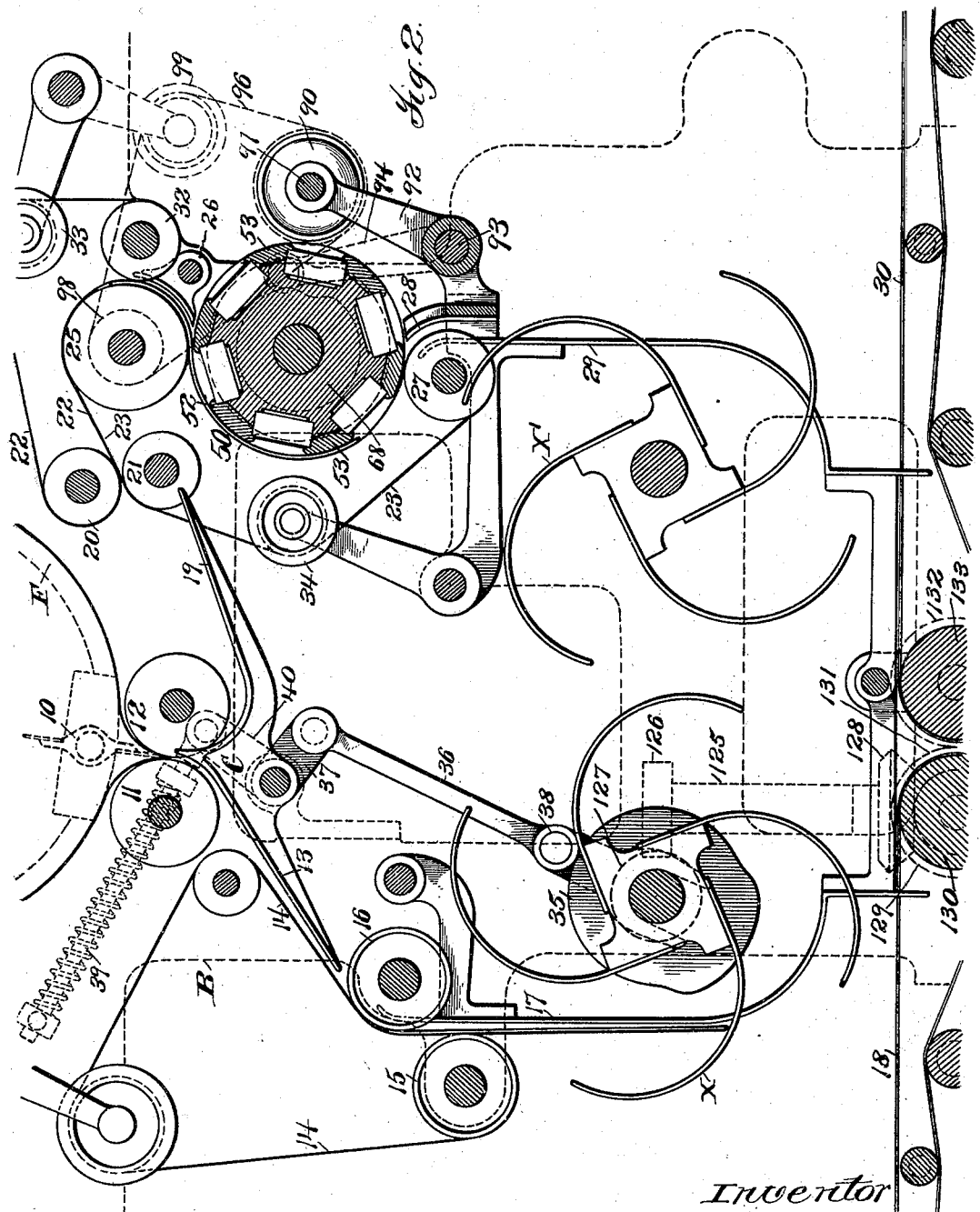

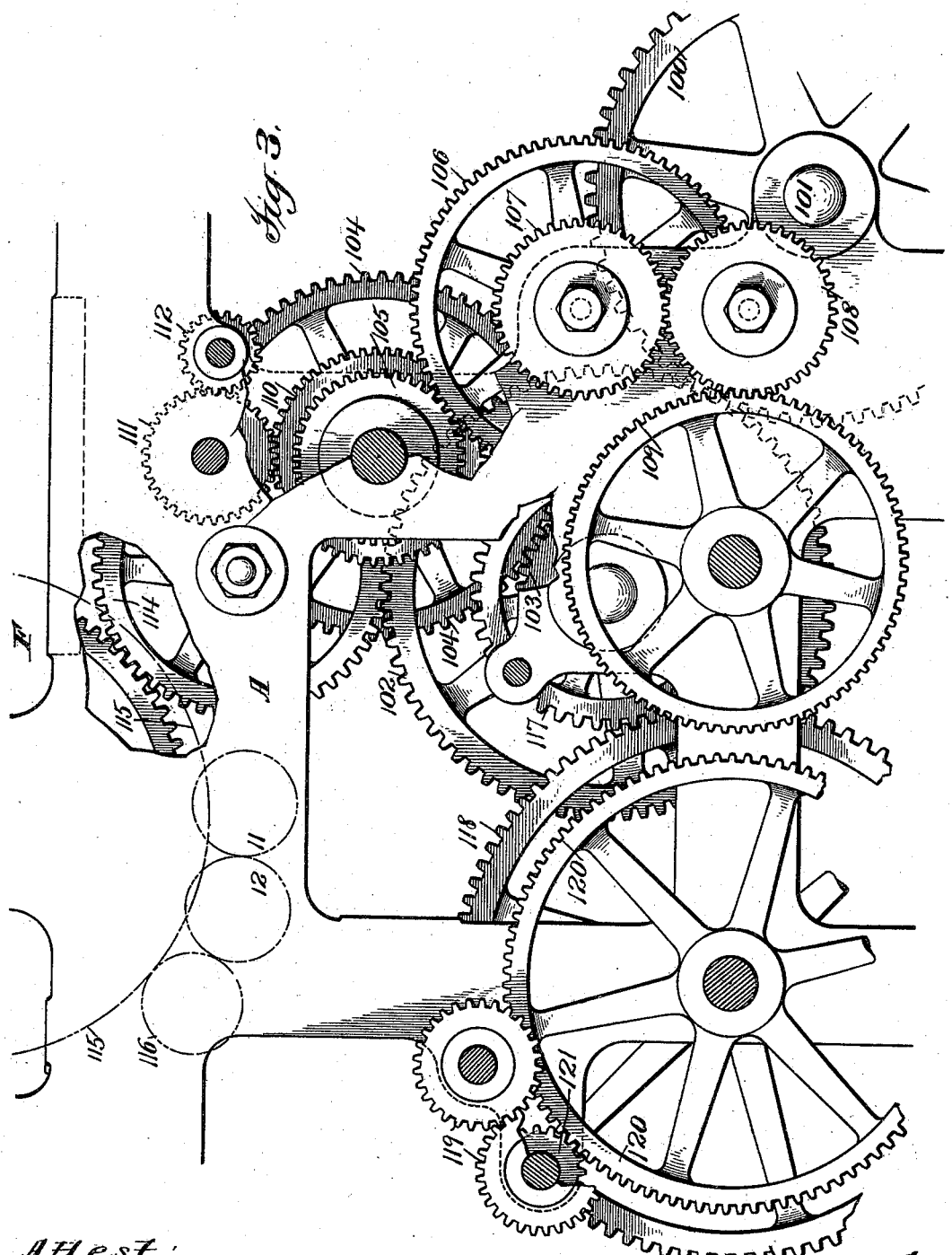

No. 646,956. Patented Apr. 10, 1900.
L. C. CROWELL.
ADDRESSING MACHINE.
(Application filed Dec. 1, 1897.)
(No Model.) 11 Sheets—Sheet 4.
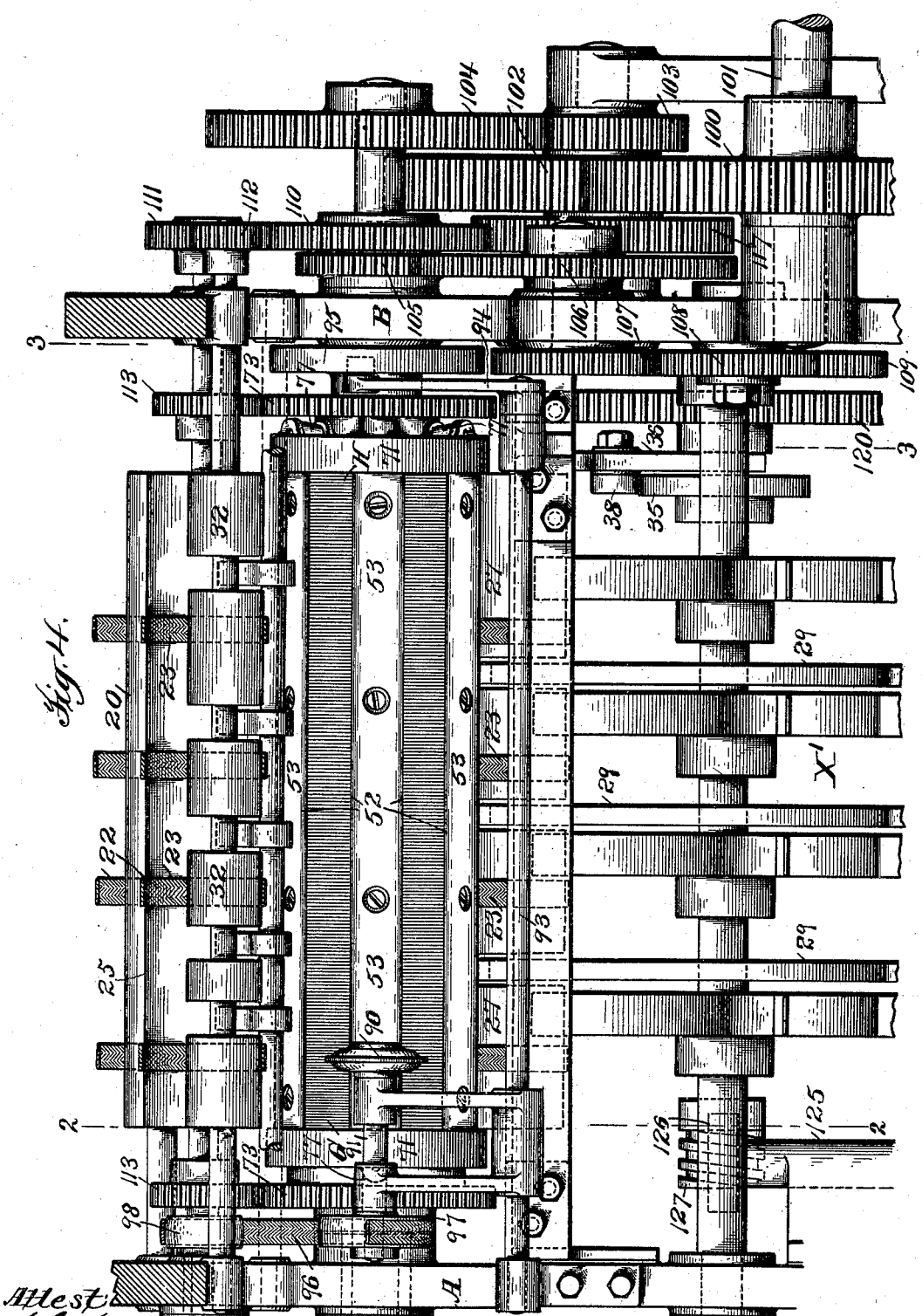

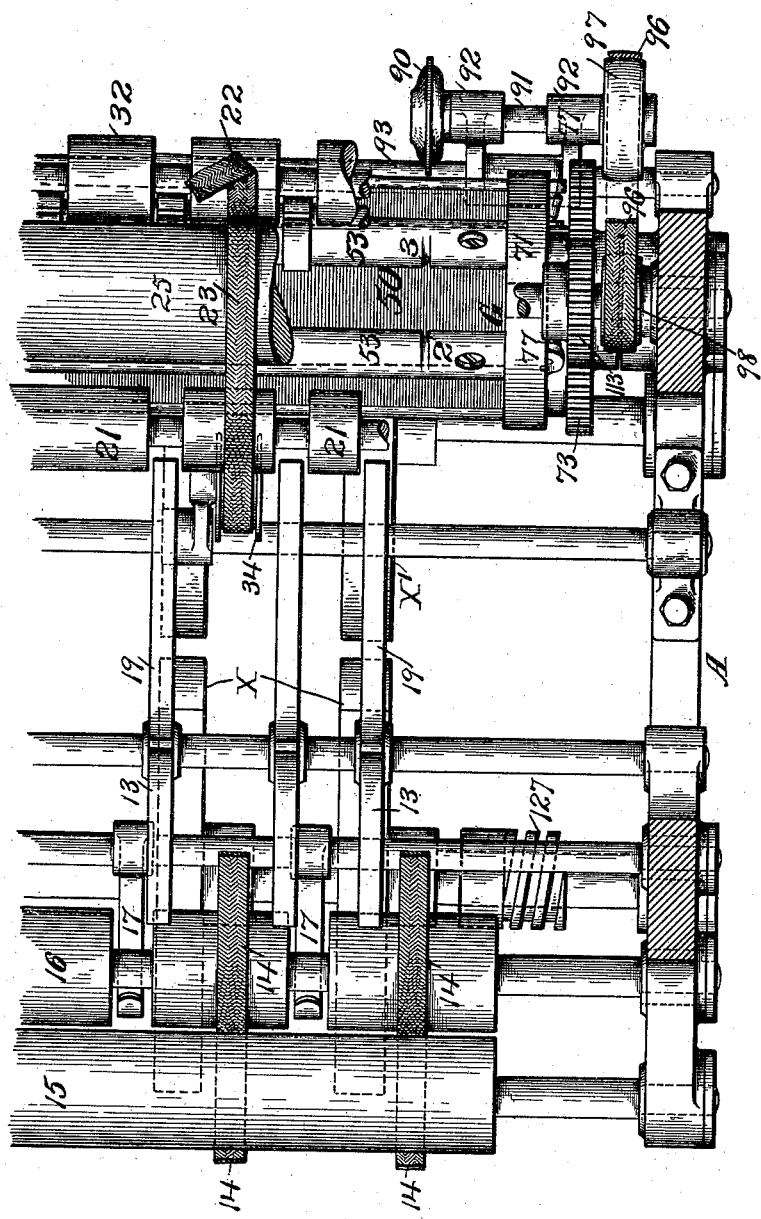

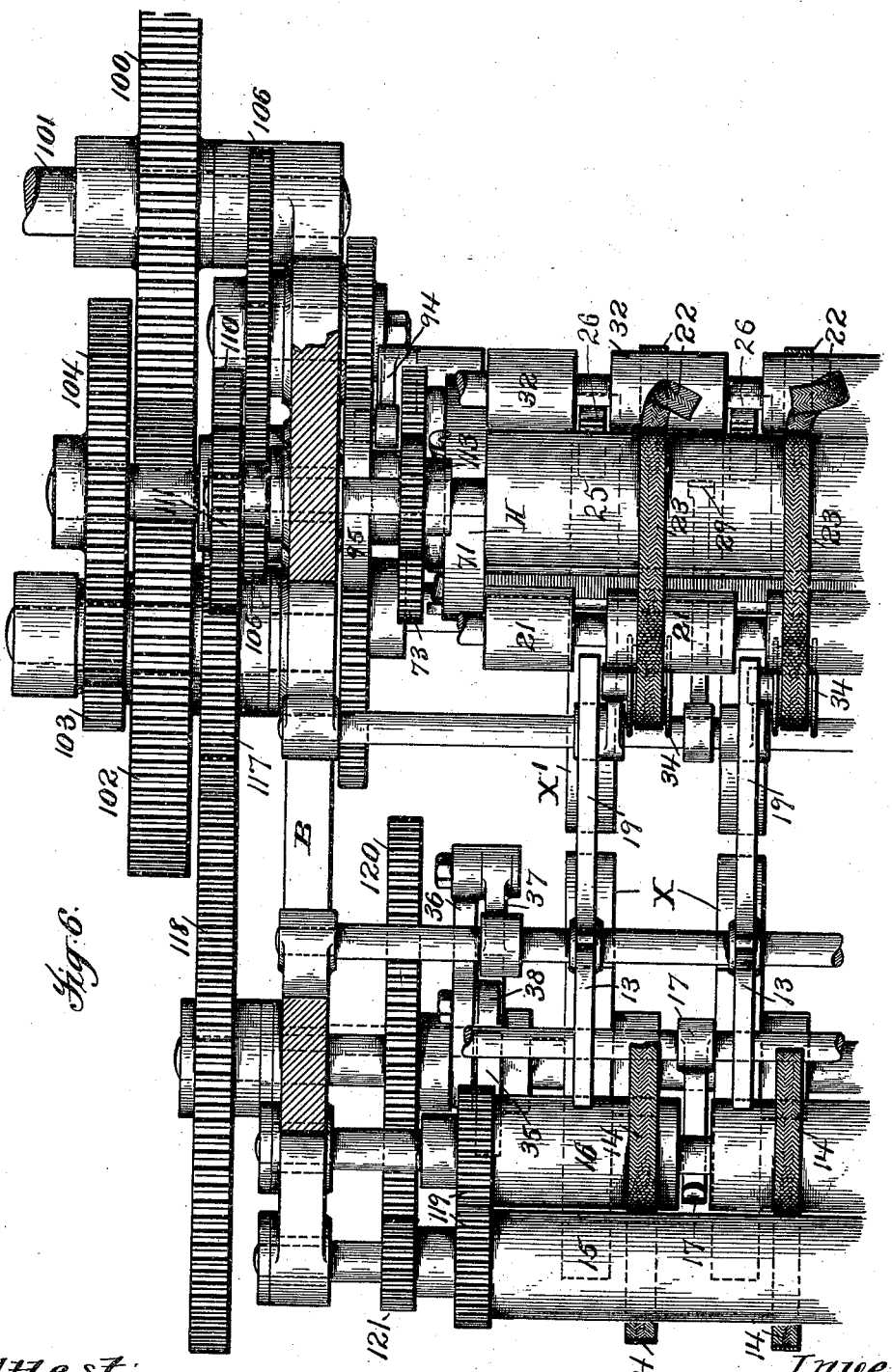

No. 646,956. Patented Apr. 10, 1900.
L. C. CROWELL.
ADDRESSING MACHINE.
(Application filed Dec. 1, 1897.)
(No Model.) 11 Sheets—Sheet 7.
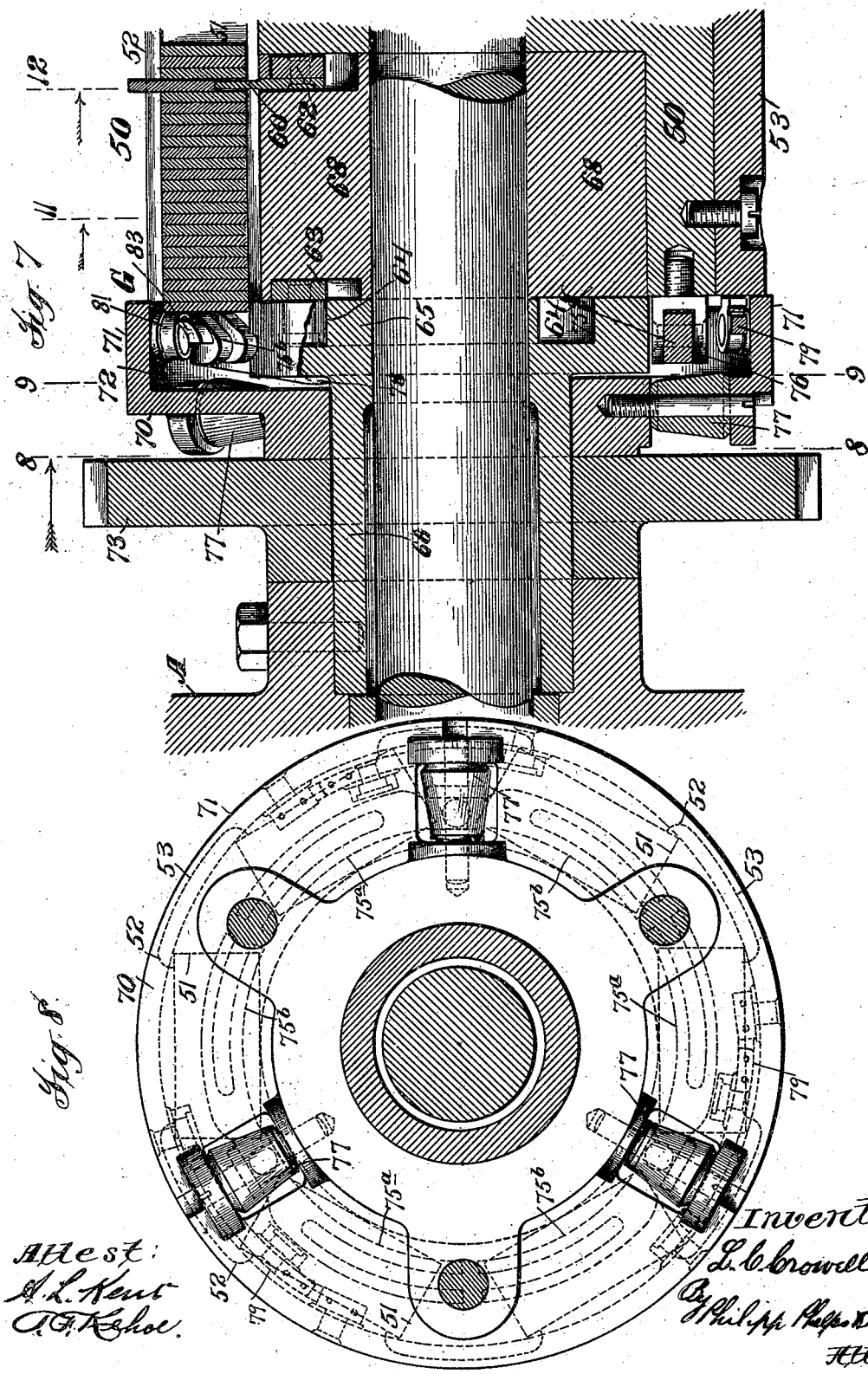

No. 646,956. Patented Apr. 10, 1900.
L. C. CROWELL.
ADDRESSING MACHINE.
(Application filed Dec. 1, 1897.)
(No Model.) 11 Sheets—Sheet 8.
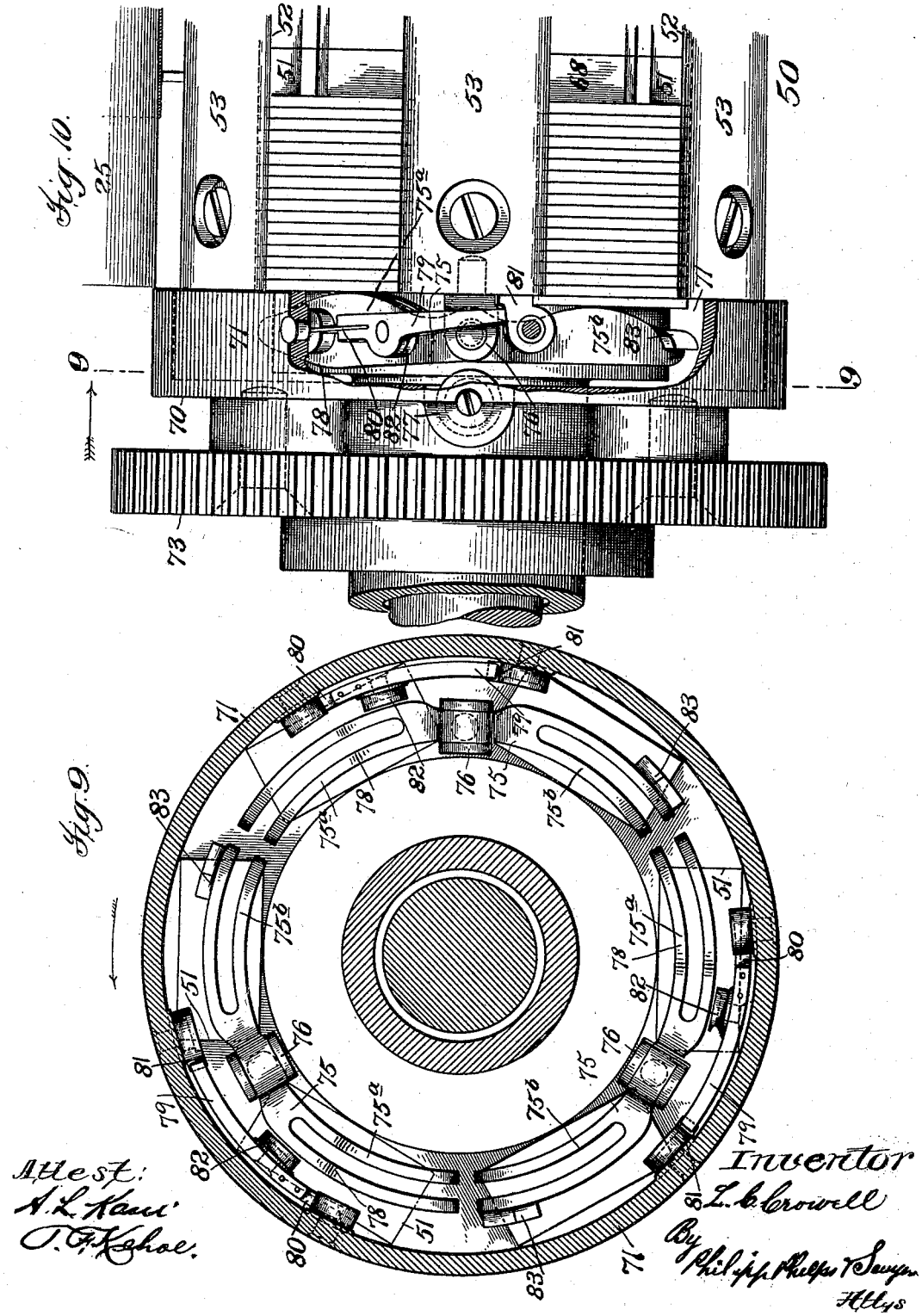

No. 646,956. Patented Apr. 10, 1900.
L. C. CROWELL.
ADDRESSING MACHINE.
(Application filed Dec. 1, 1897.)
(No Model.) 11 Sheets—Sheet 9.
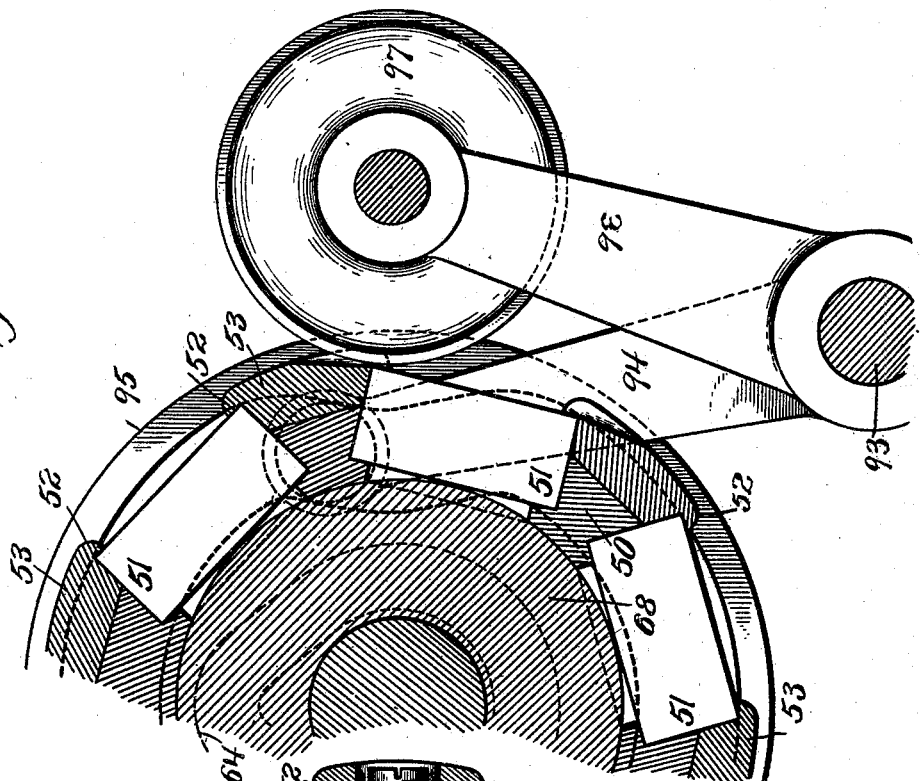
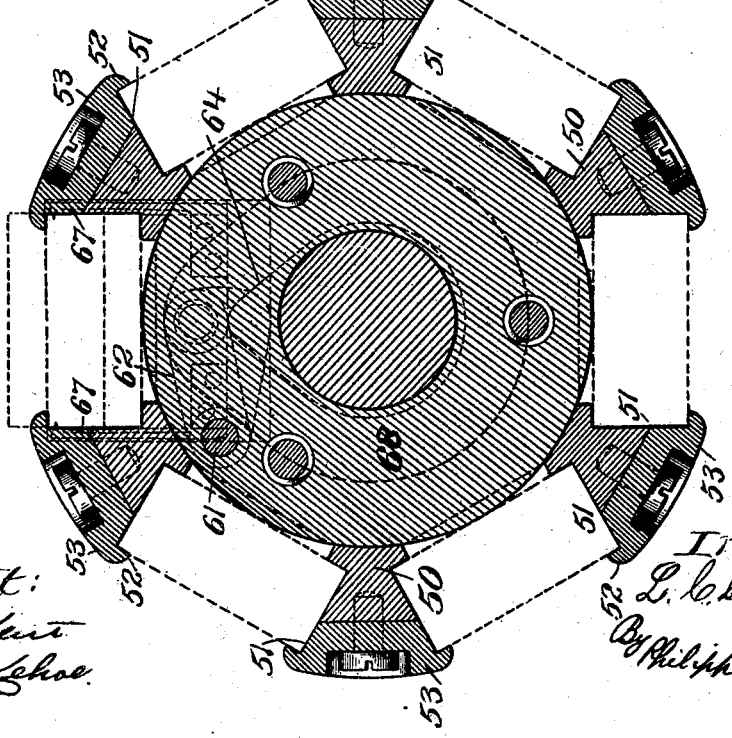
Inventor
L. C. Crowell
By Philipp Phelps Sawyer
Att'ys
Attest:
A. L. Hurst
O. F. Kehoe No. 646,956. Patented Apr. 10, 1900.
L. C. CROWELL.
ADDRESSING MACHINE.
(Application filed Dec. 1, 1897.)
(No Model.) 11 Sheets—Sheet 10.
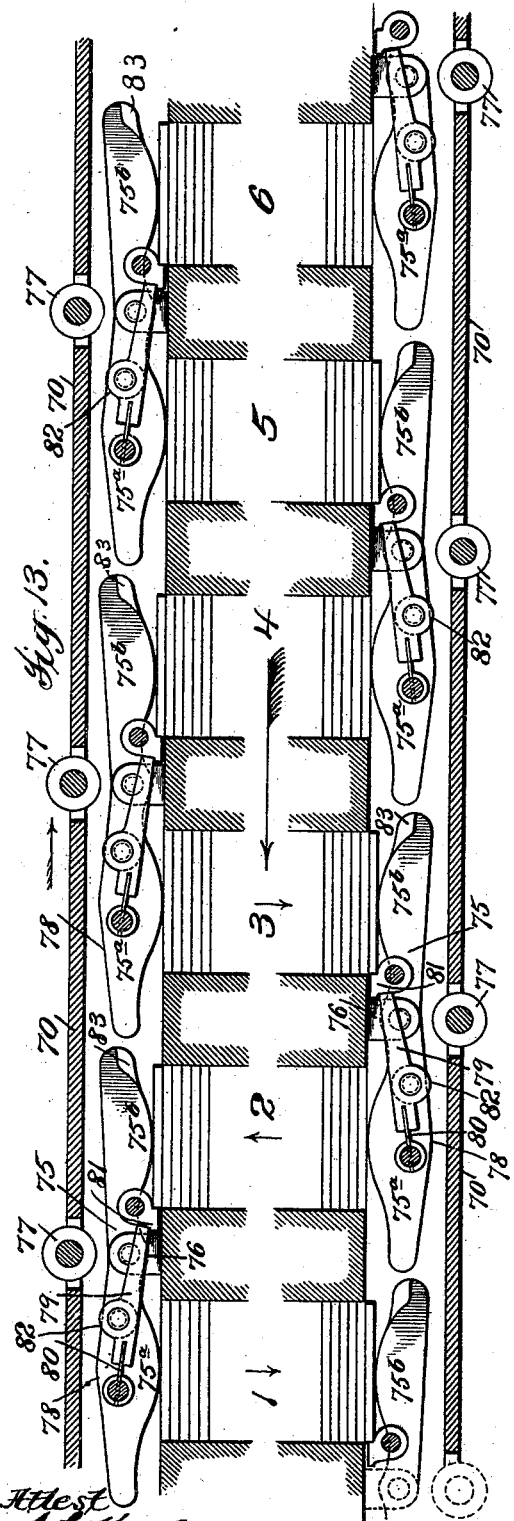
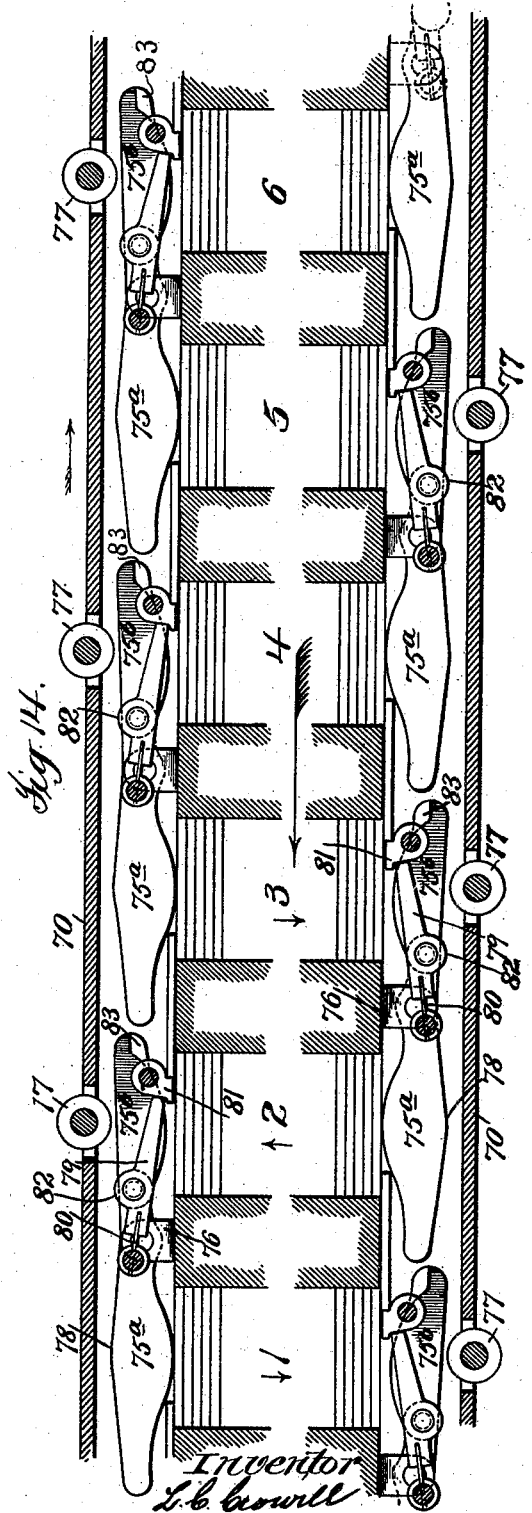

No. 646,956. Patented Apr. 10, 1900.
L. C. CROWELL.
ADDRESSING MACHINE.
(Application filed Dec. 1, 1897.)
(No Model.) 11 Sheets—Sheet 11.
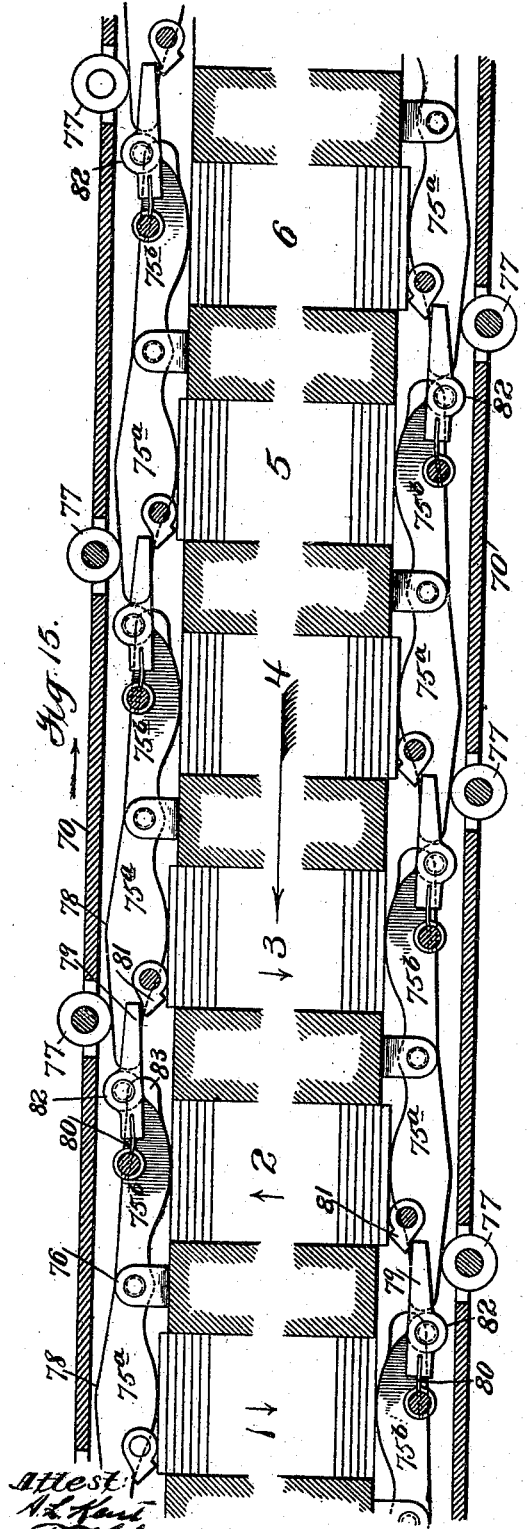
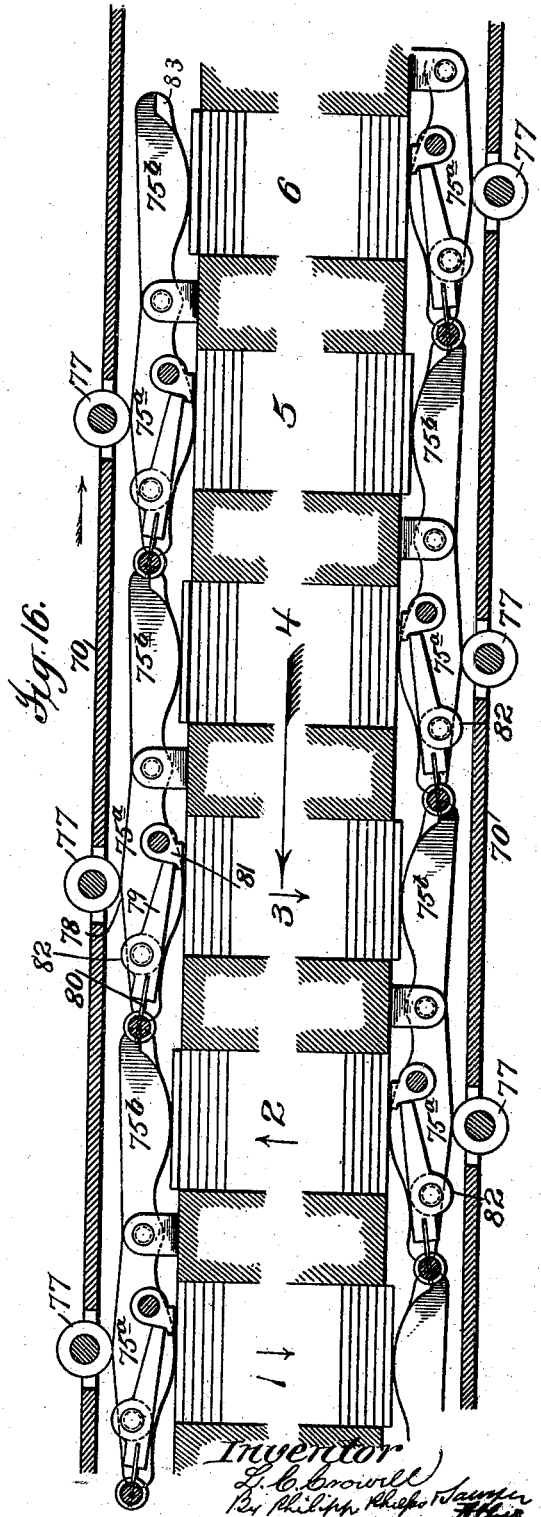

UNITED STATES PATENT OFFICE.

LUTHER C. CROWELL, OF NEW YORK, N. Y., ASSIGNOR TO ROBERT HOE, THEODORE H. MEAD, AND CHARLES W. CARPENTER, OF SAME PLACE.

ADDRESSING-MACHINE.

SPECIFICATION forming part of Letters Patent No. 646,956, dated April 10, 1900.

Application filed December 1, 1897. Serial No. 660,353. (No model.)

*To all whom it may concern:*

Be it known that I, LUTHER C. CROWELL, a citizen of the United States, residing at New York, (Brooklyn,) county of Kings, and State of New York, have invented certain new and useful Improvements in Addressing-Machines, fully described and represented in the following specification and the accompanying drawings, forming a part of the same.

This invention relates to machines for printing on newspapers or other publications or wrappers or other articles addresses or other matter from a succession of printing-surfaces.

The invention includes improvements in the address or other consecutive printing mechanism proper and improvements in the combination of an address-printing mechanism or other consecutive-printing mechanism with the delivery mechanism of a printing-press or with other delivery mechanisms, as of a folding or wrapping machine.

In the consecutive-printing mechanism I have aimed especially to provide for printing from printing-plates having the printing-faces on the edge thereof and having, preferably, a body of considerable depth relatively to its thickness, although it will be understood that features of the invention may be employed in connection with printing-plates of other forms. I have had particularly in mind and intend the mechanism particularly for handling printing plates or slugs such as are formed by the machines known as "linotype-machines."

In a construction embodying the invention in the preferred form the printing-plates are advanced endwise on edge to carry their printing edges or faces in contact with the papers or other articles by means of a carrier having a plate-holding channel in which the plates are arranged side by side flatwise and through which they are advanced flatwise to bring successive plates into printing position, in which position they are raised or projected to bring their printing edges in position to contact with the paper or other article to be printed. I preferably employ a rotary carrier having the plate-holding channel or channels arranged longitudinally of its axis of rotation, and this carrier is preferably in the form of a cylinder having the longitudinal plate-holding channel or channels arranged so that the printing-plates shall normally lie with their outer or printing edges within the periphery of the cylinder, and I preferably provide a roll in position to coact with the cylinder for feeding the papers to be addressed and as an impression-roll to coact with the printing-plates as they are successively moved into printing position and projected to contact with the papers passing between the cylinder and said roll. The cylindrical carrier is preferably provided with a plurality of longitudinal plate-holding channels and with feeding devices whereby the plates will be fed flatwise through the channels, so as to move in opposite directions through adjacent channels, and with means whereby as the plates are successively advanced from the end of one channel they will be transferred to and into the corresponding end of the adjacent channel. By this arrangement, the carrier being provided with an even number of plate-holding channels, the movement of the printing-plates will be through a continuous path including the channels and passages connecting adjacent channels alternately at opposite ends of the cylinder and through which the plates are transferred endwise on edge between the channels. The means for transferring the printing-plates from one channel to another are preferably such that the carrier and the plates being transferred shall have a relative movement at a speed lower than the speed of the carrier, the plates while being transferred preferably moving in the same direction as the carrier, but at a lower speed. Suitable inking mechanism is provided for inking the printing edges of the plates before they are moved into contact with the paper for printing.

My improved consecutive-printing mechanism may be embodied in an independent address or other consecutive printing machine, suitable feeding mechanism being also preferably provided, so that the movements of the papers or other articles and printing-plates shall be controlled to cause successive plates to print on successive papers. The printing mechanism is, however, preferably combined with the folding delivery mechanism of a printing-press or with other delivery mechanism, so that the papers will be addressed as they are delivered, and in combining the address-printing mechanism with a delivery mechanism in accordance with the present invention I provide means whereby the product passing through the delivery mechanism will be divided by means of a suitable switching device operating to direct papers alternately to the address-printing mechanism and to the general final delivery mechanism. Such switching mechanism may be arranged to direct one paper to the address-printing mechanism and the next to the general delivery, and so on, or otherwise, as desired—for instance, so as to direct every third or fourth paper to the address-printing mechanism and the remaining papers to the general delivery. By thus dividing the product passing through the delivery mechanism—as, for example, the product of a printing-press—I am enabled to cause the addressing of a portion of the product without lessening the speed of the delivery of the product as a whole and without rehandling the papers to be addressed, even though the speed at which the papers come to the delivery mechanism from the press is so great as to exceed the capacity of the address-printing mechanism, since only every second, third, or fourth paper, as the case may be, passes to the address-printing mechanism.

As a full understanding of the invention can best be given by a detailed description of a preferred construction embodying all the features of the same, such a description will now be given in connection with the accompanying drawings, illustrating such a construction, and the features forming the invention will afterward be specifically pointed out in the claims.

In said drawings, Figure 1 is a side view, partly in section, taken just inside the frame, of so much of a folding delivery mechanism embodying the present invention as is necessary to give an understanding thereof, the gearing being indicated by dotted lines. Fig. 2 is a diagrammatic sectional view taken on line 2 of Fig. 4. Fig. 3 is a section taken on line 3 of Fig. 4 and showing most of the driving gearing of the machine. Fig. 4 is an end elevation looking in the direction of the arrow 4 in Fig. 1. Fig. 5 is a plan view of one side of the mechanism with parts removed, as indicated by the section-line 5 in Fig. 1. Fig. 6 is a similar view showing the other side of the mechanism. Fig. 7 is a central sectional view of one end of the printing-plate-carrying cylinder and of the plate-transferring devices coacting therewith. Fig. 8 is a view taken on line 8 of Fig. 7. Fig. 9 is a view taken on line 9 of Figs. 7 and 10. Fig. 10 is a side elevation, partly broken away, of the parts shown in Fig. 7. Fig. 11 is a section taken on line 11 of Fig. 7. Fig. 12 is a broken sectional view taken on line 12 of Fig. 7 and showing the inking mechanism. Figs. 13, 14, 15, and 16 are diagrammatic views illustrating the operation of the plate-transferring mechanism.

The various parts of the machine are supported, as shown, by two side frames A B. There is indicated in Figs. 1, 2, and 3 by dotted lines a portion of a folding-cylinder F, having a rotary folding-blade 10 for folding a paper from the cylinder F between fold laying and feeding rolls 11 and 12. This folding apparatus is of a type well known, and shown and described in the patent to S. D. Tucker, No. 171,196, dated December 14, 1875. In the machine shown it is intended that the cylinder F shall have two of the folding-blades 10, so that for each revolution of the folding-cylinder two papers will be delivered to the fold-laying rolls 11 12. As the papers are advanced from the fold laying and feeding rolls 11 12 their course is determined by a pivoted switch C, which when in the position shown in Fig. 2 directs the papers between the arm 13 of the switch and guiding-tapes 14 to and between final-delivery rolls 15 and 16, from which they are guided by a vertical conductor 17 to an S delivery-fly X, of the usual form, to be deposited on delivery-belts 18. The delivery-fly X is formed with four arms and is timed to make one revolution to two revolutions of the folding-roll F or one revolution for every four papers delivered to the fold-laying rolls 11 12. When, however, the switch C is in the position shown in Fig. 1, the papers will be directed over the arm 19 of the switch between rolls 20 and 21 and thence advanced between tapes 22 and 23 to an impression-roll 25, about which they are turned by the tapes 22 and guides 26 to be advanced between the impression-roll 25 and the printing-plate-carrying cylinder 50 to receive the address, as hereinafter described. Thence they are advanced between the cylinder 50 and the tapes 23 to a roll 27, about which they are turned from the cylinder 50 by a guide 28, to be guided by a conductor 29 to a second S delivery-fly X' to be deposited on delivery-belts 30. The feeding-tapes 22 after leaving the impression-roll 25 turn about a roll 32, thence about tension-pulleys, 33 and back to the roll 20. The feeding-tapes 23 turn about the roll 27 and run thence to tension-pulleys 34 and thence back to the roll 21.

The switch C is operated to cause papers to be delivered alternately to the general-delivery fly X and to the addressing mechanism by means of a cam 35 on the shaft of the fly X through a pitman 36, having a forked end embracing the shaft of the fly X, having its other end connected to a rock-arm 37 on the shaft of the switch C and having a bowl 38, riding on the face of the cam 35, the action of the cam being opposed by a spring-rod 39, connected to an arm 40 on the shaft of the switch C. As shown, the cam 35 is formed so that the switch will be operated to direct every fourth paper to the addressing mechanism and the remaining papers to the general delivery. It will be understood, however, that the cam might be formed to operate the switch to deliver every second paper to the addressing mechanism or otherwise, as desired, the other coöperating parts being timed accordingly.

The speed of the feeding-tapes 22 and 23 and of the impression-roll 25 and the printing-plate-carrying cylinder 50 may be, and preferably is, and is so shown in the drawings, less than that of the fold laying and feeding rolls 11 12, since by the arrangement just described the papers directed to the addressing mechanism form only a portion of the product which passes between the fold laying and feeding rolls 11 12, and consequently follow each other at greater intervals of time than do the papers through the fold laying and feeding rolls 11 12. I thus provide for a slower operation of the address-printing mechanism than would be necessary if all the papers passing between the fold laying and feeding rolls 11 12 were directed to the address-printing mechanism, and am thus enabled by the above-described arrangement for dividing the product delivered to the fold laying and feeding rolls 11 12 to cause a portion of the product to be addressed without delaying the delivery of the product as a whole and without necessitating a second handling of the portion of the product to be addressed, even though the speed of delivery of the papers to the rolls 11 12 is greater than the speed at which the papers could be addressed by the address-printing mechanism.

Referring now to the means for presenting successive printing-plates for printing on successive papers passing between the printing-plate-carrying cylinder 50 and the impression-roll 25, the printing-plates are arranged side by side on edge in a series of guideways or channels 51, extending longitudinally of the plate-carrying cylinder 50, such guideways or channels being formed to hold the plates with their outer or printing edges inside the periphery of the cylinder, as shown, and being formed with retaining-shoulders 52 for holding the plates in place. These retaining-shoulders 52 are preferably formed by the edges of retaining-strips 53, which are removably secured to the portions of the cylinder between the plate-holding channels, so that by removing the strips the printing-plates may be readily placed in or removed from the channels. The bottoms of the channels are preferably cut away, as shown in Fig. 2, to reduce the friction of the printing-plates in the channels. The printing-plates are moved flatwise through these channels and endwise from one channel to another by feeding and transferring mechanism, hereinafter described, so that plates will successively occupy a position selected as the printing position of the plates, the movement of the plates in the machine shown being such that at each revolution of the cylinder a different plate will occupy the printing position.

The normal position of the plates in the channel being, as before pointed out, such that their printing edges lie within the periphery of the cylinder it is necessary that the plate from which an impression is to be taken shall be projected radially of the cylinder, so as to contact with the paper passing between the cylinder and the impression-roll. For this purpose I provide an elevator or projector 60, arranged to engage the bottom of a plate when it has been moved into printing position, which in the machine shown is in one of the channels, and to project it radially of the cylinder for printing, as shown in Fig. 7, the retaining-shoulders 52 being cut away, as shown at 2 and 3, to permit the plates to be thus projected by the elevator. The elevator 60 is formed by a plate arranged to move radially of the cylinder and operated by means of a rock-shaft 61, journaled in the cylinder 50, and having at one end a rock-arm 62, carrying a pin riding in a slot in the elevator 60, and having at its other end a rock-arm 63, carrying a bowl riding in a cam-groove 64 in a stationary cam-disk 65, carried by a sleeve 66, loose on the shaft of the cylinder 50 and secured to the frame A. As the cylinder 50 rotates, therefore, the rock-shaft 61 will be rocked by the cam 64, which is formed in the machine shown so as to project the elevator 60 once for each revolution of the cylinder. The elevator 60 is provided with gripping-arms 67, which grip the edges of the printing-plates, so that when the elevator is retracted the plate which has been projected will also be retracted.

As the printing edges of the plates are not curved to correspond with the periphery of the cylinder, but extend in a right line, when a printing-plate is projected so as to bring its middle portion into position to coact with the impression-roll for printing—that is, to the position shown by dotted lines in Fig. 11—the ends of the plate extend considerably farther beyond the periphery of the cylinder. The cam 64 is therefore formed to move the elevator so that when the forward edge of the printing-plate is brought by the rotation of the cylinder opposite the impression-roll the plate will have been projected only so far as to bring its forward end into proper position radially of the cylinder to coact with the impression-roll. Then as the rotation of the cylinder continues the plate will be farther projected until when the middle portion of the plate is opposite the impression-roll the plate will have been projected to the greatest extent to bring its middle portion into proper position radially of the cylinder to coact with the impression-roll. Then the elevator will begin to recede to carry the plate inward again, so that when the rear end of the plate comes opposite the impression-roll it will be in proper position radially of the cylinder to coact with the impression-roll.

The position of the elevator 60 and of the slots 2 and 3 longitudinally of the cylinder is such as to cause the addresses to be printed at the desired point on the papers, being in the machine shown near one end of the cylinder. The rock-shaft 61 is preferably journaled in a block 68, set in the recessed end of the cylinder, as shown in Fig. 7, the block 68 thus forming a part of the cylinder.

The devices for feeding the plates longitudinally of the channels 51 and for transferring them from one channel to the adjacent channel will now be described, such devices being best shown in Figs. 7 to 12 and in the diagrammatic views Figs. 13 to 16. Each of the ends G H of the cylinder 50 is provided with a set of feeding and transferring devices, which devices are alike, except as to their position with relation to the series of plate-holding channels 51. The feeding and transferring devices at one end of the cylinder, as G, will therefore be described, and such description will be understood to apply to the devices at the other end of the cylinder, except in regard to their position relatively to the series of channels, as will be hereinafter pointed out. For convenience in this description the channels will be designated by the figures 1, 2, 3, 4, 5, and 6, respectively. Mounted to rotate on the sleeve 66 is a sleeve carrying a transferring-disk 70, having an annular flange 71 extending toward the end of the cylinder 50, so as to form an annular chamber 72 between the end of the cylinder and the disk 70 and the flange 71 and the cam-disk 65. The sleeve carrying the transferring disk 70 also carries or has secured to it a gear 73, which is driven so as to rotate the transferring-disk at a speed less than that of the cylinder 50. In the construction shown, in which the cylinder has six plate-holding channels, the transferring-disk should be driven so as to make two-thirds of a revolution while the cylinder 50 makes a complete revolution. Thus for each revolution of the cylinder the transferring-disk will move relatively to the cylinder a third of a revolution in the opposite direction. Pivoted to studs 76, extending from the end of the cylinder at alternate spaces between the plate-holding channels, are a series of feeding-arms 75, each formed of two branches 75$^a$ and 75$^b$, which extend, respectively, opposite the ends of channels on either side of the studs 76. The arms 75$^a$ will thus extend opposite alternate channels, as 1, 3, and 5, the arms 75$^b$ then extending opposite the channels numbered 2, 4, and 6, as shown. There will be half as many of these feeding-arms 75 as there are plate-holding channels in the cylinder, so that an arm 75$^a$ or 75$^b$ will extend opposite the end of each channel—that is, in the construction shown there will be three such feeding-arms. Carried by the transferring-disk 70 and arranged at equal distances from each other are three cam-rolls 77, positioned to engage cam-faces 78 on the branches 75$^a$ of the arms 75, so that as the transferring-disk rotates relatively to the cylinder the branches 75$^a$ of the arms 75 will be moved toward the ends of the three plate-holding channels 1, 3, and 5. Carried by the flange 71 of the transferring-disk are three arms 79, supported at one end and under spring tension, as by supporting-spring 80, to cause their free ends to move toward the end of the cylinder, so as to engage and hold in operative position, as shown in Fig. 10, transferring-feet 81, carried by the flange 71. The arms 79 also carry studs or antifriction-rolls 82, in position to be engaged by cams 83 on the branches 75$^b$ of the feeding-arms 75, whereby as the transferring-disk moves relatively to the cylinder the arms 75 will be tripped to release the transferring-feet 81. Transferring devices at the other end H of the cylinder 50, similar in all other respects to those at the end G of the cylinder, are arranged with respect to the plate-holding channels so as to alternate with the devices at the end G—that is, their position is such that the branches 75$^a$ of the feeding-arms 75 shall be opposite the channels numbered 2, 4, and 6 and the branches 75$^b$ opposite the channels 1, 3, and 5. The branches 75$^a$ of the feeding-arms at one end of the cylinder are thus opposed to the branches 75$^b$ of the feeding-arms at the other end of the cylinder.

The operation of the devices just described will be readily understood by reference to the diagrammatic views, Figs. 13 to 16. The plate-holding channels being filled with printing-plates, or partly with printing-plates and partly with blank plates of corresponding size, and starting with the parts in position as shown in Fig. 13, in which the plates in each channel have been moved so that the end plate in each channel at the end toward the branch 75$^b$ of the feeding-arms 75 shall have been advanced beyond the end of the cylinder, the operation will be as follows: The transferring-disk 70 moving at only two-thirds of the speed of the cylinder 50 the relative movement of the two for one revolution of the cylinder will be the same as though the cylinder were stationary and the transferring-disk moved one-third of a revolution in the direction the reverse of that of the actual movement of the cylinder and of the disk. In the diagrams, therefore, as the central arrow indicates the actual direction of movement of the cylinder and of the disk the small arrows at the top of each figure represent the relative direction of movement of the transferring-disk with relation to the cylinder. Starting, therefore, with the parts in position as shown in Fig. 13, each of the printing-plates which has been advanced beyond the end of the cylinder being engaged by one of the transferring-feet 81, held in operative position by the spring-pressed arms 79, will be caused to move relatively to the cylinder in the direction in which the transferring-disk moves relatively thereto, as shown by Fig. 14, the plates moving in a path or guideway extending circumferentially of the ends of the cylinder between the ends of the cylinder and the branches of the feeding-arms 75 and the cam-disks 65 and the flanges 71 of the transferring-disks. This movement of the plates will continue until each plate has been moved into position opposite the channel end behind that from which it has been transferred, at which time the rolls 82 on the arms 79 will have been engaged by the cams 83 on the receiving branches 75$^b$ of the feeding-arms to trip the arms 79, as shown in Fig. 15, thereby releasing the transferring-feet 81, so that they shall be free to turn out of engagement with the ends of the printing-plates, as shown in said Fig. 15. A plate from each channel will thus have been moved to position opposite the end of the next channel and then allowed to rest in that position. Then as the movement of the transferring-disk relatively to the cylinder continues, the transferring-feet moving idly past the plates which they have moved into position, the cam-faces 78 of the feeding branches 75$^a$ of the feeding-arms 75 will each be engaged by one of the cam-rolls 77 and moved inward toward the ends of the cylinder, whereby said feeding branches are caused to move the corresponding column of plates longitudinally in the channels, so as to move the plates which have just been positioned opposite the ends of the channels into the channels and to cause the end plates at the other ends of the column to be advanced from the channels beyond the end of the cylinder, as shown in Fig. 16. By the movements just described, therefore, a printing-plate from the channel marked 1 will have been transferred to a position opposite the end of the channel marked 2 and then entered into that channel, a printing-plate from the channel marked 2 will have been transferred and entered into the channel marked 3, a printing-plate from the channel marked 3 will have been transferred and entered into the channel 4, and so on around the cylinder, a plate from the channel marked 6 having been transferred and entered into the channel marked 1, and the columns of plates in the several channels will have been moved so that each plate will have been advanced a distance corresponding to the thickness of a plate, the plates in the channels 1 3 5 moving in one direction and the plates in the channels 2, 4, and 6 moving in the other direction, as indicated by the arrows. By the continued movement of the transferring-disk relatively to the cylinder from the position shown in Fig. 16, the transferring-feet having been returned to operative position by the spring-pressed arms 79 after the bowls 82 have moved out of engagement with the cams 83, the parts will again take the relative positions shown in Fig. 13, except that the transferring-disk will have made a third of a revolution relatively to the cylinder, and the operations above described will be repeated. By the continued repetition of these feeding and transferring movements each of the printing-plates will be caused to move flatwise through the plate-holding-channels successively, being transferred from the end of one channel endwise on edge to the end of the succeeding channel. Take, for example, a plate in the channel marked 1. It will be advanced by successive steps in the direction of the arrow until it is advanced beyond the channel against the receiving branch 75$^b$ of the feeding-arm opposite the channel 1. Then it will be transferred endwise into position opposite the end of the channel 2. Then it will be advanced flatwise through the channel 2 in the opposite direction to that in which it was advanced through the channel 1, then endwise to the channel 3, flatwise through the channel 3 in the direction of the arrow, endwise to the channel 4, flatwise through the channel 4, to and through the channel 5, and to and through the channel 6, and then endwise to position to be entered into the channel 1, and the operation of the mechanism still continuing the movement of this plate, as of every other plate, will be continued. The printing-plates will thus occupy successively any position in the course of the plates as they are advanced through the channels and from channel to channel which may be selected as the printing position, and the series of plates will repeatedly occupy the printing position in succession as they are advanced through the channels by the continued repeated operation of the mechanism. In the machine shown there will be one feeding and transferring movement for each revolution of the plate-carrying cylinder.

When a printing-plate has been moved into printing position, as just described, and before it is moved endwise on edge in contact with a paper passing between the plate-carrying cylinder and the impression-roll, it is desirable that the printing edge of the plate be inked. For this purpose I preferably provide an inking-disk 90, of any suitable construction, having an inking-face of a width but little greater than the width of the printing edge of the printing-plates. This inking-disk is carried by a shaft 91, journaled in arms 92, carried by a rock-shaft 93, journaled in the frames A and B. The rock-shaft 93 carries at the opposite side of the machine from the inking-disk an arm 94, having a pin extending into a cam-groove in a cam-disk 95 on the shaft of the plate-carrying cylinder, this cam-groove being formed so that as the channel containing the plate to be inked comes opposite the inking-disk the shaft 93 will be rocked to throw the arm 92 inward toward the cylinder to carry the disk into contact with the printing-plate to be inked, the slots 2 and 3 in the retaining-shoulders 52, through which the printing-plates are projected for printing, being extended, as shown at 3 and 4 in Fig. 12, to permit the inking-disk to be moved inward, so as to contact with the plate to be inked throughout its length. The plate which has been moved into printing position will thus be inked before the beginning of its movement by the elevator 60 as it approaches the impression-roll. The inking-disk 90 is preferably rotated by means of a belt 96, passing around a pulley 97 on the shaft 91 of the disk and around a driving-pulley 98 on the shaft of the impression-roll and a tension-pulley 99.

The operation of the machine as a whole will be understood from the foregoing description of the construction and operation of the parts and need not be further pointed out.

The various moving parts of the machine are driven from a gear 100 on the main driving-shaft 101 as follows: The gear 100 meshes with a gear 102 on a shaft which also carries a gear 103, meshing with a gear 104 on the shaft of the plate-carrying cylinder 50, which shaft also carries a gear 105, which meshes with a gear 106, carried by a shaft which also carries a gear 107, which meshes with an intermediate 108, meshing with a gear 109 on the shaft of the delivery-fly X', these gears being timed so as to cause the delivery-fly to rotate four times to one rotation of the plate-carrying cylinder. The shaft of the plate-carrying cylinder 50 also carries a gear 110, meshing with a gear 111 on the shaft of the impression-roll 25, which gear 111 also meshes with a gear 112 on the shaft of the roll 32. The shaft of the impression-roll also carries two gears 113, meshing with the transferring-disk-driving gears 73, the gears 113 and 73 being of such relative size as to give the transferring-disk two-thirds of a revolution to one revolution of the plate-carrying cylinder. The folding-cylinder F is driven from the gear 102 through an intermediate 114. The fold-laying rolls 11 12 carry intermeshing gears and are driven from a gear 115, carried by the folding-roll F, through an intermediate 116. The shaft of the gear 102 also carries a gear 117, which meshes with a gear 118 on the shaft of the general delivery-fly X, these gears being timed so as to cause the fly X to make one revolution to two revolutions of the folding-cylinder F. The fly having four branches will thus receive and deliver to the belts 18 all the papers passing from the folding-cylinder F between the fold-laying rolls 11 12, if desired. The rolls 15 16 carry intermeshing gears 119 and are driven from a gear 120 on the shaft of the fly X, meshing with a gear 121 on the shaft of the roll 15. The delivery-belts 18 are driven from the shaft of the delivery-fly X through a vertical worm-shaft 125, having at one end a worm-wheel 126, engaging a worm 127 on the shaft of the fly X and having on the other end the bevel-gear 128, engaging a similar gear 129 on the shaft of the roll 130, about which the delivery-belts 18 turn. The delivery-belts 30 are driven from a gear 131 on the shaft of the roll 130, which meshes with a gear 132 on the shaft of the roll 133, about which the belts 30 turn.

It will be understood that the invention is not to be limited to the exact construction shown for the purpose of illustrating the invention and to which the foregoing description has been mainly confined, but that various changes and modifications thereof may be made within the claims. It will be understood, also, that the term "paper" is used in the claims to include all articles for printing on which machines embodying the invention or features thereof, as claimed, may be used.

What I claim is—

1. The combination with delivery mechanism including feeding devices and a final-delivery mechanism, of a consecutive-printing mechanism, a switch whereby papers may be directed to the final-delivery mechanism or to the consecutive-printing mechanism, and means for automatically operating said switch to direct papers alternately to the final-delivery mechanism and to the consecutive-printing mechanism, substantially as described.

2. The combination with delivery mechanism including feeding devices and a general final-delivery mechanism, of a consecutive-printing mechanism and a final-delivery mechanism therefor, a switch whereby papers may be directed to the general final-delivery mechanism or to the consecutive-printing mechanism, and means for automatically operating said switch to direct papers alternately to the general final-delivery mechanism and to the consecutive-printing mechanism, substantially as described.

3. The combination of a carrier having a printing-plate-holding channel, means for feeding the printing-plates longitudinally of said channel to bring the plates successively into printing position, means for projecting the plates for printing when in printing position, and means for moving the carrier transversely to the plate-holding channel, substantially as described.

4. The combination of a carrier having a channel for holding printing-plates, means for feeding the printing-plates longitudinally of said channel to bring the plates successively into printing position, means for projecting the plates for printing when in printing position, means for moving the carrier transversely to the plate-holding channel and means for bringing a paper in contact with the projected plate as it is advanced by said carrier, substantially as described.

5. The combination of a carrier having a channel for holding printing-plates, means for feeding the printing-plates longitudinally of said channel to bring the plates successively into printing position, means for moving the carrier transversely to the plate-holding channel, and means for bringing a paper in contact with the plate which has been moved into printing position as it is advanced by the movement of the carrier, substantially as described.

6. The combination of a carrier having a channel for holding printing-plates, means for feeding the printing-plates longitudinally of said channel to bring the plates successively into printing position, means for projecting the plates when in printing position, means for moving the carrier transversely to the plate-holding channel, and means for bringing a paper in contact with the projected plate as it is advanced by the movement of the carrier, substantially as described.

7. The combination of a rotary carrier having a channel extending longitudinally of its axis for holding printing-plates, means for feeding the printing-plates longitudinally of said channel to bring the plates successively into printing position, means for projecting the plates when in printing position, and means for bringing a paper in contact with the projected plate, substantially as described.

8. The combination of a rotary carrier having a channel extending longitudinally of its axis for holding printing-plates, means for feeding the printing-plates longitudinally of said channel to bring the plates successively into printing position, means for projecting the plates when in printing position, and means for feeding a paper in contact with the projected plate as it is advanced by the rotation of the carrier, substantially as described.

9. The combination of a rotary carrier having a channel extending longitudinally of its axis for holding printing-plates, means for feeding the printing-plates longitudinally of said channel to bring the plates successively into printing position, an impression-roll, and means for projecting the plates when in printing position to coact with said impression-roll for printing, substantially as described.

10. The combination of a rotary carrier having a channel extending longitudinally of its axis for holding printing-plates, means for feeding the printing-plates longitudinally of said channel to bring the plates successively into printing position, and means for bringing a paper in contact with the plate which has been moved into printing position, substantially as described.

11. The combination of a rotary carrier fixed against movement longitudinally of its axis having a channel extending longitudinally of its axis for holding printing-plates, and means for projecting the printing-plates successively for printing, substantially as described.

12. The combination of a rotary carrier having a printing-plate-holding channel, means for feeding the printing-plates longitudinally of said channel to bring the plates successively into printing position, and means for projecting the plates for printing when in printing position, substantially as described.

13. The combination of a carrier having a plurality of parallel channels for holding printing-plates, and means for feeding the printing-plates longitudinally of said channels and from one channel to another to bring the plates successively into printing position, substantially as described.

14. The combination of a carrier having a plurality of parallel channels for holding printing-plates, means for feeding the printing-plates longitudinally of said channels and from one channel to another to bring the plates successively into printing position, means for projecting the plates when in printing position, and means for feeding a paper in contact with the projected plate as it is advanced by said carrier, substantially as described.

15. The combination of a rotary carrier having a plurality of channels extending longitudinally of its axis for holding printing-plates, and means for feeding the printing-plates longitudinally of said channels and from one channel to another to bring the plates successively into printing position, substantially as described.

16. The combination of a rotary carrier having a plurality of channels extending longitudinally of its axis for holding printing-plates, means for feeding the printing-plates longitudinally of said channels and from one channel to another to bring the plates successively into printing position, means for projecting the plates when in printing position, and means for bringing a paper in contact with the projected plate, substantially as described.

17. The combination of a rotary carrier having a plurality of channels extending longitudinally of its axis for holding printing-plates, means for feeding the printing-plates longitudinally of said channels and from one channel to another to bring the plates successively into printing position, means for projecting the plates when in printing position, and means for feeding a paper in contact with the projected plate as it is advanced by the rotation of the carrier, substantially as described.

18. The combination of a rotary cylinder having a longitudinal channel for holding printing-plates normally within the periphery of the cylinder, an impression-roll, feeding devices for feeding a succession of papers between the impression-roll and the cylinder, means for feeding the printing-plates longitudinally of said channel to bring the plates successively into printing position, and means for projecting the plates radially of the cylinder when in printing position to contact with the papers as they are advanced between the impression-roll and the cylinder, substantially as described.

19. The combination of a rotary cylinder having a plurality of longitudinal channels for holding printing-plates normally within the periphery of the cylinder, an impression-roll, means for feeding a succession of papers between the cylinder and the impression-roll, means for feeding the printing-plates longitudinally of said channels and from one channel to another to bring the plates successively into printing position, and means for projecting the plates radially of the cylinder when in printing position to contact with the papers as they are advanced between the cylinder and the impression-roll, substantially as described.

20. The combination of a rotary cylinder fixed against movement longitudinally of its axis having a printing-plate-holding channel, an impression-roll, feeding devices for feeding a succession of papers between the impression-roll and the cylinder, and means for positioning the printing-plates successively to contact with the papers as they are advanced between the impression-roll and the cylinder, substantially as described.

21. The combination of a carrier having a channel for holding printing-plates having edge printing-surfaces and arranged side by side flatwise, means for feeding the printing-plates flatwise in said channel to bring the plates successively into printing position, means for projecting the plates for printing when in printing position, and means for moving the carrier transversely to the plate-holding channel, substantially as described.

22. The combination of a carrier having a channel for holding printing-plates having edge printing-surfaces and arranged side by side flatwise, means for feeding the printing-plates flatwise in said channel to bring the plates successively into printing position, means for moving the carrier transversely to the plate-holding channel, and means for bringing a paper in contact with the plate which has been moved into printing position as it is advanced endwise by the movement of the carrier, substantially as described.

23. The combination of a rotary carrier having a channel extending longitudinally of its axis for holding printing-plates having edge printing-surfaces and arranged side by side flatwise, means for feeding the printing-plates flatwise in said channel to bring the plates successively into printing position, means for projecting the plates when in printing position, and means for feeding a paper in contact with the projected plate as it is advanced endwise by the rotation of the carrier, substantially as described.

24. The combination of a rotary carrier having a channel extending longitudinally of its axis for holding printing-plates having edge printing-surfaces and arranged side by side flatwise, means for feeding the printing-plates flatwise in said channel to bring the plates successively into printing position, and means for projecting the plates when in printing position, substantially as described.

25. The combination of a carrier having a plurality of parallel channels for holding printing-plates having edge printing-surfaces and arranged side by side flatwise, and means for feeding the printing-plates flatwise in said channel and endwise from one channel to another to bring the plates successively into printing position, substantially as described.

26. The combination of a rotary carrier having a plurality of channels extending longitudinally of its axis for holding printing-plates having edge printing-surfaces and arranged side by side flatwise, and means for feeding the printing-plates flatwise in said channels and endwise from one channel to another to bring the plates successively into printing position, substantially as described.

27. The combination of a rotary carrier having a plurality of channels extending longitudinally of its axis for holding printing-plates having edge printing-surfaces and arranged side by side flatwise, means for feeding the printing-plates flatwise in said channels and endwise from one channel to another to bring the plates successively into printing position, means for projecting the plates when in printing position, and means for feeding a paper in contact with the projected plate as it is advanced by the rotation of the carrier, substantially as described.

28. The combination of a carrier having a channel extending longitudinally of its axis for holding printing-plates, means for feeding the printing-plates longitudinally of said channel to bring the plates successively into printing position, an elevator 60 having gripping-arms 67, and means for actuating the elevator to project the plates for printing and to retract them after printing, substantially as described.

29. The combination of a rotary carrier having a channel extending longitudinally of its axis for holding printing-plates, means for feeding the printing-plates longitudinally of said channel to bring the plates successively into printing position, an elevator 60 having gripping-arms 67, and means for actuating the elevator to project the plates for printing and to retract them after printing, substantially as described.

30. The combination of a rotary carrier having a channel extending longitudinally of its axis for holding printing-plates, means for feeding the printing-plates longitudinally of said channel to bring the plates successively into printing position, an elevator for projecting the plates when in printing position and retracting them, an impression-roll, and means for actuating the elevator to project and retract the plates gradually for coaction of all parts of the printing-surface with the impression-roll, substantially as described.

31. The combination of a rotary carrier having a channel extending longitudinally of its axis for holding printing-plates, means for feeding the printing-plates longitudinally of said channel to bring the plates successively into printing position, an elevator for projecting the plates when in printing position and retracting them, an impression-roll, means for actuating the elevator to project and retract the plates gradually for coaction of all parts of the printing-surface with the impression-roll, and means for inking the plates before they are projected by the elevator, substantially as described.

32. The combination of a rotary carrier having a plurality of channels extending longitudinally of its axis for holding printing-plates, means for feeding the printing-plates longitudinally of said channels and from one channel to another to bring the plates successively into printing position, an inking-disk 90 normally out of operative position, and means for moving said disk into operative position to ink the successive plates before printing, substantially as described.

33. The combination of a rotary carrier having a printing-plate-holding channel extending longitudinally of its axis, means for feeding the printing-plates longitudinally of said channel to bring the plates successively into printing position, an elevator 60, rock-shaft 61 having an arm 62 connected with the elevator, cam 64, and an arm 63 by which the shaft is rocked by said cam, substantially as described.

34. The combination of a carrier having a plurality of channels extending transversely of the direction of movement of the carrier for holding printing-plates, means for feeding the printing-plates longitudinally of said channels in opposite directions in different channels, and means for transferring the plates from one channel to another, the carrier and the plates being transferred having a relative movement at a speed lower than the speed of the carrier, substantially as described.

35. The combination of a carrier having a plurality of channels extending transversely of the direction of movement of the carrier for holding printing-plates, means for feeding the printing-plates longitudinally of said channels in opposite directions in different channels, and means for transferring the plates from one channel to another, the plates while being transferred moving in the same direction as the carrier but at a lower speed, substantially as described.

36. The combination of a rotary carrier having a plurality of channels extending longitudinally of its axis for holding printing-plates, means for feeding the printing-plates longitudinally of said channels in opposite directions in different channels, and means for transferring the plates from one channel to another, the carrier and the plates being transferred having a relative rotary movement at a speed lower than the speed of the carrier, substantially as described.

37. The combination of a rotary carrier having a plurality of channels extending longitudinally of its axis for holding printing-plates, means for feeding the printing-plates longitudinally of said channels in opposite directions in different channels, and means for transferring the plates from one channel to another, the plates while being transferred moving in the same direction as the carrier but at a lower speed, substantially as described.

38. The combination of a rotary carrier having a plurality of channels extending longitudinally of its axis for holding printing-plates, means for feeding the printing-plates longitudinally of said channels in opposite directions in different channels, members for engaging the printing-plates which have been advanced from the channels to transfer them to other channels, said members and the carrier having a relative rotary movement at a speed lower than the speed of the carrier, substantially as described.

39. The combination of a rotary carrier having an even number of channels extending longitudinally of the axis of the carrier for holding printing-plates, means for feeding the printing-plates longitudinally of said channels, the plates in adjacent channels being fed in opposite directions, and means for transferring the plates as they are advanced from the ends of the channels to the ends of adjacent channels, substantially as described.

40. The combination of a rotary carrier having a plurality of channels extending longitudinally of the axis of the carrier for holding printing-plates, means for feeding the printing-plates longitudinally of said channels, the plates in adjacent channels being fed in opposite directions, members for engaging the printing-plates which have been advanced from the ends of the channels to transfer them to the adjacent channels, said members and the carrier having a relative rotary movement, and means for tripping said members to release the plates when they have been transferred to said adjacent channels, substantially as described.

41. The combination of a rotary carrier having an even number of channels extending longitudinally of the axis of the carrier for holding printing-plates, means for feeding the printing-plates longitudinally of said channels, the plates in adjacent channels being fed in opposite directions, members for engaging the printing-plates which have been advanced from the ends of the channels to transfer them to the adjacent channels, said members and the carrier having a relative rotary movement, and means for tripping said members to release the plates when they have been transferred to said adjacent channels, substantially as described.

42. The combination of a rotary carrier having an even number of channels extending longitudinally of the axis of the carrier for holding printing-plates, feeding-arms 75 at each end of the carrier, each of said feeding-arms having a feeding branch 75$^a$ and a receiving branch 75$^b$ extending opposite the ends of adjacent channels and the feeding branches of the arms at one end of the carrier being opposed to the receiving branches of the arms at the other end of the carrier, means for simultaneously rocking said arms to move their feeding branches inward to feed the plates in the channels, and means for transferring the plates which are advanced from the ends of the channels to the adjacent channels, substantially as described.

43. The combination of a rotary carrier having an even number of channels extending longitudinally of the axis of the carrier for holding printing-plates, feeding-arms 75 at each end of the carrier, each of said feeding-arms having a feeding branch 75$^a$ and a receiving branch 75$^b$ extending opposite the ends of adjacent channels and the feeding branches of the arms at one end of the carrier being opposed to the receiving branches of the arms at the other end of the carrier, a transferring-disk 70 at each end of the carrier, members carried by said disks for rocking said arms simultaneously to move the feeding branches 75$^a$ inward to advance the printing-plates in the channels and the receiving branches 75$^b$ outward for receiving the plates advanced from the channels, transferring-feet 81 carried by the transferring-disks 70, means for holding said feet in position to engage the plates which have been advanced from the channels to transfer them to the adjacent channels, and means for tripping said feet when the plates have been transferred to said adjacent channels, substantially as described.

44. The combination of a rotary carrier having an even number of channels extending longitudinally of the axis of the carrier for holding printing-plates, feeding-arms 75 at each end of the carrier, each of said feeding-arms having a feeding branch 75$^a$ and a receiving branch 75$^b$ extending opposite the ends of adjacent channels and the feeding branches of the arms at one end of the carrier being opposed to the receiving branches of the arms at the other end of the carrier, a transferring-disk 70 at each end of the carrier, members carried by said disks for rocking said arms simultaneously to move the feeding branches 75$^a$ inward to advance the printing-plates in the channels and the receiving branches 75$^b$ outward for receiving the plates advanced from the channels, transferring-feet 81 carried by the transferring-disks 70, arms 79 carried by the transferring-disks for holding the transferring-feet in position to engage the plates which have been advanced from the channels to transfer them to the adjacent channels, and cams on the feeding-arms 75 for tripping the arms 79 to release the transferring-feet when the plates have been transferred to said adjacent channels, substantially as described.

45. The combination of printing-plate-holding channels 51, feeding-arms 75 having feeding branches 75$^a$ and receiving branches 75$^b$, and means for transferring the printing-plates from one channel to another, substantially as described.

46. The combination of printing-plate-holding channels 51, feeding-arms 75 having feeding branches 75$^a$ and receiving branches 75$^b$, transferring-feet 81, arms 79, and cams 83, substantially as described.

47. The combination of a rotary carrier having an even number of printing-plate-holding channels 51, feeding-arms 75 at each end of the carrier having feeding branches 75$^a$ and receiving branches 75$^b$, a transferring-disk 70 at each end of the carrier having flanges 71, cams 77 and transferring-feet 81, and means for tripping the transferring-feet 81, substantially as described.

48. The combination of a rotary carrier having an even number of plate-holding channels 51, feeding-arms 75 at each end of the carrier having feeding branches 75$^a$ and receiving branches 75$^b$, a transferring-disk 70 at each end of the carrier having flanges 71, cams 77 and transferring-feet 81, and means for rotating said disks in the same direction as the carrier but at a lower speed, substantially as described.

In testimony whereof I have hereunto set my hand in the presence of two subscribing witnesses.

LUTHER C. CROWELL.

Witnesses:
C. J. SAWYER,
T. F. KEHOE.